(12) United States Patent
Hiramatu et al.

(10) Patent No.: US 9,681,508 B2
(45) Date of Patent: Jun. 13, 2017

(54) LIGHT MODULATION CONTROL UNIT, ILLUMINATION SYSTEM, AND FACILITY APPARATUS

(71) Applicant: Panasonic Intellectual Property Management Co., Ltd., Osaka (JP)

(72) Inventors: Akinori Hiramatu, Nara (JP); Hirohiko Nojiri, Kyoto (JP); Takeshi Kamoi, Kyoto (JP); Hiroshi Kido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 117 days.

(21) Appl. No.: 14/885,117

(22) Filed: Oct. 16, 2015

(65) Prior Publication Data

US 2016/0113079 A1  Apr. 21, 2016

(30) Foreign Application Priority Data

Oct. 20, 2014 (JP) .................................. 2014-213872

(51) Int. Cl.
*H05B 33/08* (2006.01)
(52) U.S. Cl.
CPC ........ *H05B 33/0818* (2013.01); *Y02B 20/347* (2013.01)
(58) Field of Classification Search
None
See application file for complete search history.

(56) References Cited

U.S. PATENT DOCUMENTS

2010/0219764 A1*  9/2010  Yamasaki .......... H05B 33/0818
                                                                315/224
2012/0262082 A1  10/2012  Esaki et al.

FOREIGN PATENT DOCUMENTS

JP           2012-226924 A       11/2012

* cited by examiner

*Primary Examiner* — Dedei K Hammond
(74) *Attorney, Agent, or Firm* — Renner, Otto, Boisselle & Sklar, LLP

(57) ABSTRACT

A light source circuit includes light-emitting diodes and a constant current circuit that controls current flowing through light-emitting diodes to a fixed level. A DC power supply circuit outputs a DC voltage having a voltage value capable of causing light-emitting diodes to emit light. A light modulation control unit includes: a MOSFET electrically connected between DC power supply circuit and light source circuit; and a control circuit configured to control MOSFET. Control circuit is configured to turn MOSFET on and off with a duty ratio corresponding to a light modulation level such that DC voltage that is outputted from DC power supply circuit is converted to a square wave voltage, and the square wave voltage is outputted to light source circuit. The square wave voltage has an amplitude equal to the voltage value of the DC voltage that is outputted from DC power supply circuit.

18 Claims, 6 Drawing Sheets

LIGHT MODULATION CONTROL UNIT, ILLUMINATION SYSTEM, AND FACILITY APPARATUS

CROSS-REFERENCE TO RELATED APPLICATIONS

The application is based upon and claims the benefit of priority of Japanese Patent Application No. 2014-213872, filed on Oct. 20, 2014, the entire content of which is incorporated herein by reference.

TECHNICAL FIELD

This disclosure relates to light modulation control units, illumination systems, and facility apparatuses, and specifically relates to a light modulation control unit for performing light modulation control on a semiconductor light-emitting element for light emission, an illumination system, and a facility apparatus.

BACKGROUND ART

Heretofore, there has been a lighting device including: a step up chopper circuit that rectifies and smooths output of an AC power supply and outputs a fixed DC voltage; a step down chopper circuit that steps down the output of the step up chopper circuit and supplies the resultant voltage to a semiconductor light-emitting element; and a light modulation control circuit (refer to JP 2012-226924 A (hereinafter referred to as Document 1), for example).

In this lighting device, the light modulation control circuit controls the on-time length of a switching element included in the step down chopper circuit so as to perform light modulation control on the semiconductor light-emitting element.

In the lighting device described in Document 1, the step up chopper circuit generates a fixed voltage higher than the voltage to be applied to the semiconductor light-emitting element by rectifying and smoothing an AC voltage inputted from the AC power supply. Then, the step down chopper circuit steps down the output voltage of the step up chopper circuit to a voltage corresponding to the semiconductor light-emitting element, and supplies the resultant voltage to the semiconductor light-emitting element. Therefore, there was a problem in that, in the lighting device described in Document 1, switching loss occurred in both the step up chopper circuit and the step down chopper circuit. Also, the step up chopper circuit steps up the output voltage to the fixed voltage that is higher than the voltage to be applied to the semiconductor light-emitting element, and therefore large circuit components having high breakdown voltage need to be used in the step up chopper circuit and the step down chopper circuit, and therefore there was also a problem in that the lighting device increases in size.

SUMMARY

The present technology has been made in view of the above-described problems, and an object of the present technology is to provide a small light modulation control unit having reduced switching loss, an illumination system, and a facility apparatus.

A light modulation control unit of an aspect according to the present technology is for a light source circuit driven by a DC power supply. The light source circuit includes a semiconductor light-emitting element. The DC power supply is configured to output a DC voltage having a voltage value capable of causing the semiconductor light-emitting element to emit light. The light modulation control unit includes a switching element and a control circuit. The switching element is configured to be electrically connected between the light source circuit and the DC power supply. The control circuit is configured to control a switching operation of the switching element. The control circuit is configured to perform switching of the switching element with a duty ratio corresponding to a light modulation level such that the DC voltage that is outputted from the DC power supply is converted to a square wave voltage, and the square wave voltage is outputted to the light source circuit. The square wave voltage has an amplitude equal to the voltage value of the DC voltage that is outputted from the DC power supply.

An illumination system of an aspect according to the present technology includes: a light source circuit that includes a semiconductor light-emitting element; and the above light modulation control unit that is configured to perform light modulation control on the light source circuit.

A facility apparatus of an aspect according to the present technology includes a light source circuit that includes: a semiconductor light-emitting element; the above light modulation control unit that is configured to perform light modulation control on the light source circuit; and a facility apparatus body configured to hold the light source circuit and the light modulation control unit.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Hereinafter, a light modulation control unit, an illumination system, and a facility apparatus according to the present embodiment will be described with reference to the drawings. Note that the configuration to be described below is only an example of the present technology. The present technology is not limited to the following embodiment, and various modifications can be made according to the design or the like, as long as they do not depart from the technical concept of the present technology.

Figure 1:
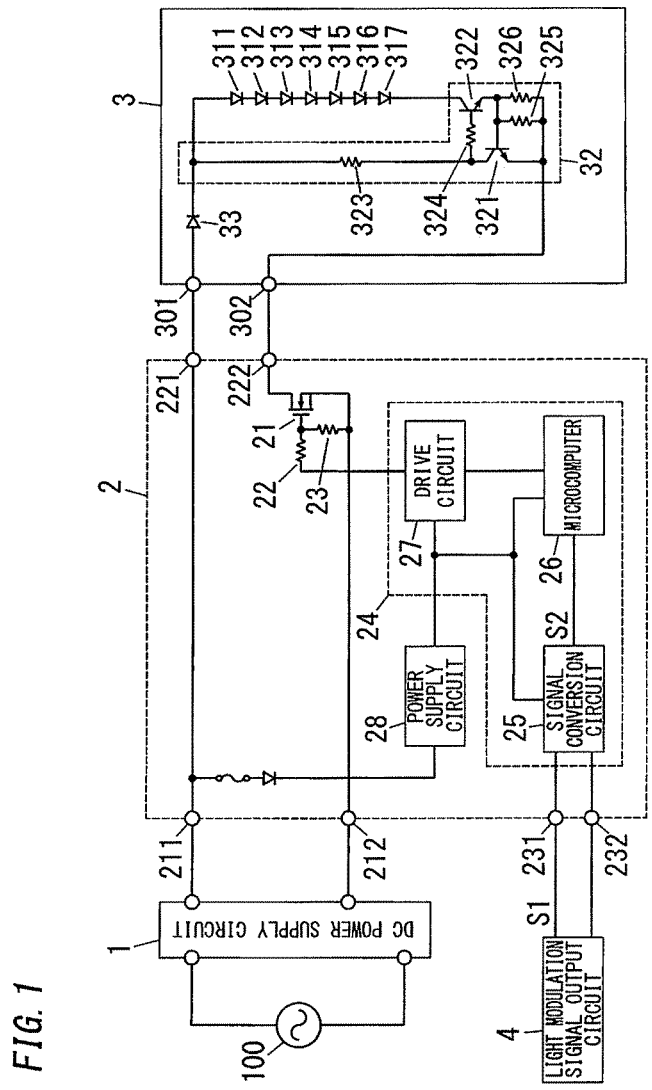
FIG. 1 is a circuit diagram of an illumination system of an embodiment.

FIG. 1 is a circuit diagram of the illumination system. The illumination system of the present embodiment includes a DC power supply circuit 1, a light modulation control unit 2, a light source circuit 3, and a light modulation signal output circuit 4.

The DC power supply circuit 1 is configured to convert an AC voltage received from an AC power supply 100 such as a commercial AC power supply (AC 100 to 242 V, for example) to a fixed DC voltage, and output the DC voltage. The DC power supply circuit 1 can be a conventional switching power supply. The DC power supply circuit 1 outputs a DC voltage having a voltage value (DC 24 V, for example) capable of causing a semiconductor light-emitting element(s) of the light source circuit 3 to emit light.

The light source circuit 3 includes seven light-emitting diodes 311 to 317, which are semiconductor light-emitting elements, a constant current circuit 32 for controlling a current that flows through the light-emitting diodes 311 to 317 to a fixed level, and a diode 33 for backflow prevention. The constant current circuit 32 includes transistors 321 and 322 and resistors 323 to 326. Note that although the light source circuit 3 includes the light-emitting diodes 311 to 317 as the semiconductor light-emitting elements, the light source circuit 3 may include an electroluminescence (EL) element(s) or the like as the semiconductor light-emitting element(s) instead of the light-emitting diodes 311 to 317.

The light source circuit 3 includes a pair of connection terminals 301 and 302. An anode of the diode 33 is connected to the connection terminal 301 on a positive electrode side. A collector of the transistor 321 is connected to a cathode of the diode 33 via the resistor 323. An emitter of the transistor 321 is connected to the connection terminal 302 on a negative electrode side. The collector of the transistor 321 is connected to a base of the transistor 322 via the resistor 324, and an emitter of the transistor 322 is connected to a base of the transistor 321. A parallel circuit of the resistors 325 and 326 is connected between the emitter of the transistor 322 and the emitter of the transistor 321. Also, the seven light-emitting diodes 311 to 317 are connected in series between the cathode of the diode 33 and the collector of the transistor 322 such that the current flow direction therein is the same as that in the diode 33.

The light modulation control unit 2 includes: a connection terminal 211 that is connected to a positive electrode side output terminal of the DC power supply circuit 1; and a connection terminal 212 that is connected to a negative electrode side output terminal of the DC power supply circuit 1. The light modulation control unit 2 includes: a positive electrode side connection terminal 221 that is connected to the connection terminal 301 of the light source circuit 3; and a negative electrode side connection terminal 222 that is connected to the connection terminal 302 of the light source circuit 3. The light modulation control unit 2 includes a pair of connection terminals 231 and 232 that are respectively connected to two output terminals of the light modulation signal output circuit 4. Here, the pair of connection terminals 211 and 212 constitutes a first connection portion for connecting the DC power supply circuit 1, and the pair of connection terminals 221 and 222 constitutes a second connection portion for connecting the light source circuit 3.

The connection terminal 211 is electrically connected to the connection terminal 221 via an internal interconnection.

A drain of a MOS type field effect transistor (Metal Oxide Semiconductor Field Effect Transistor, hereinafter referred to as MOSFET) 21 is connected to the connection terminal 222. A source of the MOSFET 21 is connected to the connection terminal 212, and a resistor 23 is connected between a gate and the source of the MOSFET 21. Note that although the light modulation control unit 2 of the present embodiment includes the MOSFET 21 serving as a switching element, the switching element is not limited to the MOSFET, and may be a bipolar transistor such as an IGBT (Insulated Gate Bipolar Transistor), for example.

The light modulation control unit 2 includes a control circuit 24 configured to control turning on and off of the MOSFET 21. The control circuit 24 includes a signal conversion circuit 25, a microcomputer 26, and a drive circuit 27.

A light modulation signal S1 is inputted to the signal conversion circuit 25 from the light modulation signal output circuit 4 via the connection terminals 231 and 232. The light modulation signal S1 that is outputted from the light modulation signal output circuit 4 is a PWM signal whose duty ratio changes according to the light modulation level specified by a light modulator or the like (not shown) for the light source circuit 3, for example. The signal conversion circuit 25 smooths the light modulation signal S1 received from the light modulation signal output circuit 4, for example, and thus converts the light modulation signal S1 to a voltage signal S2 whose voltage value changes in a range such as from 0 V to 10 V according to the duty ratio (that is, light modulation level) of the light modulation signal S1. Note that the light modulation signal S1 that is inputted to the signal conversion circuit 25 from the light modulation signal output circuit 4 is not limited to the PWM signal, and may also be a voltage signal whose voltage value changes according to the light modulation level specified by the light modulator or the like. In the case where the light modulation signal S1 is a voltage signal whose voltage value changes according to the light modulation level, the signal conversion circuit 25 may adjust the variation range of the voltage value of the voltage signal S2 with respect to the light modulation signal S1, and output the voltage signal S2 to the microcomputer 26.

The microcomputer 26 is configured to execute a control operation on the MOSFET 21 by executing a program stored in a ROM. The microcomputer 26 is configured to generate a PWM signal whose duty ratio changes according to the voltage value of the voltage signal S2 received from the signal conversion circuit 25, and outputs the PWM signal to the drive circuit 27. For example, as the voltage value of the voltage signal S2 increases/decreases, the microcomputer 26 increases/decreases the duty ratio of the generated PWM signal.

An output terminal of the drive circuit 27 is connected to the gate of the MOSFET 21 via a resistor 22. The drive circuit 27 is configured to turn the MOSFET 21 on and off according to the duty ratio of the PWM signal received from the microcomputer 26. For example, when the signal level of the PWM signal is a high level, the drive circuit 27 causes the MOSFET 21 to be in an on state, and when the signal level of the PWM signal is a low level, the drive circuit 27 causes the MOSFET 21 to be in an off state.

The light modulation control unit 2 further includes a power supply circuit 28. The power supply circuit 28 is configured to convert the DC voltage having a voltage value (DC 24 V, for example) received from the DC power supply circuit 1 to a DC voltage having a predetermined voltage value (DC 12 V, for example), and supply the converted DC voltage to the signal conversion circuit 25, the microcomputer 26, and the drive circuit 27.

The illumination system of the present embodiment includes the configuration described above, and hereinafter the operation thereof will be described. First, an operation in the case where the light modulation control unit 2 causes each of the light-emitting diodes 311 to 317 of the light source circuit 3 to be fully lighted will be described. Note that a light-emitting diode being fully lighted refers to a state in which the light-emitting diode is caused to emit light at a light modulation level of 100%.

Assume that the light modulation signal output circuit 4 outputs, to the light modulation control unit 2, a PWM signal having the duty ratio of 0% as the light modulation signal S1 for causing each of the light-emitting diodes 311 to 317 of the light source circuit 3 to be fully lighted. Here, the signal conversion circuit 25 converts the light modulation signal S1 to the voltage signal S2 having the voltage value of 0 V by smoothing the light modulation signal S1 received from the light modulation signal output circuit 4 and outputs the voltage signal S2 to the microcomputer 26.

The microcomputer 26, upon determining that the light modulation level specified to the light source circuit 3 is 100% based on the voltage value (0 V, for example) of the voltage signal S2 received from the signal conversion circuit 25, outputs a drive signal for causing the MOSFET 21 to be continuously on to the drive circuit 27. At this time, the drive circuit 27 causes the MOSFET 21 to be continuously on in response to the drive signal received from the microcomputer 26.

When the MOSFET 21 is turned on, a voltage is applied to the base of the transistor 322 from the DC power supply circuit 1 via the diode 33 and the resistor 324, and the transistor 322 is turned on. When the transistor 322 is turned on, a current flows through the light-emitting diodes 311 to 317, and the light-emitting diodes 311 to 317 emit light. When the current flows through the light-emitting diodes 311 to 317, a voltage is generated across the resistors 325 and 326. When this voltage exceeds a threshold voltage of the transistor 321, the transistor 321 is turned on. When the transistor 321 is turned on, the base voltage of the transistor 322 decreases below the threshold voltage, the transistor 322 is turned off, and the light-emitting diodes 311 to 317 stop light emission. When the transistor 322 is turned off, the transistor 321 is also turned off, and therefore, again, a voltage is applied to the base of the transistor 322 from the DC power supply circuit 1 via the diode 33 and the resistor 324, and the transistor 322 is turned on. As a result of repeating the operation described above, the current flowing through the light-emitting diodes 311 to 317 is controlled to a fixed current. Since the MOSFET 21 is continuously on and the fixed current flows through the light-emitting diodes 311 to 317, each of the light-emitting diodes 311 to 317 of the light source circuit 3 emits light at the light modulation level of 100% (fully lighted).

Next, an operation in the case where the light modulation control unit 2 performs light-modulation control on the light source circuit 3 will be described.

When the light modulation signal S1 constituted by a PWM signal having a duty ratio corresponding to the specified light modulation level is inputted to the light modulation control unit 2 from the light modulation signal output circuit 4, the signal conversion circuit 25 converts the light modulation signal S1 to the voltage signal S2 having a voltage value corresponding to the duty ratio of the light modulation signal S1, and outputs the voltage signal S2 to the microcomputer 26.

The microcomputer 26, upon receiving the voltage signal S2 from the signal conversion circuit 25, generates a PWM signal having a duty ratio corresponding to the voltage value of the voltage signal S2, and outputs the PWM signal to the drive circuit 27.

The drive circuit 27 controls turning on and off of the MOSFET 21 according to the signal level of the PWM signal received from the microcomputer 26. That is, the drive circuit 27 causes the MOSFET 21 to be in an on state in a period during which the signal level of the PWM signal received from the microcomputer 26 is a high level, and causes the MOSFET 21 to be in an off state in a period during which the signal level of the PWM signal is a low level. When the drive circuit 27 turns on the MOSFET 21, a DC voltage is applied to the light source circuit 3 from the DC power supply circuit 1 via the light modulation control unit 2, and the light-emitting diodes 311 to 317 emit light. On the other hand, when the drive circuit 27 turns off the MOSFET 21, a current stops flowing through the light source circuit 3, and the light-emitting diodes 311 to 317 stop light emission. Accordingly, a square wave voltage is applied to the light source circuit 3 from the light modulation control unit 2, and each of the light-emitting diodes 311 to 317 of the light source circuit 3 intermittently emits light.

Note that in a state in which a DC voltage is applied to the light source circuit 3, the current flowing through the light-emitting diodes 311 to 317 is controlled to a fixed level by the constant current circuit 32. Also, a square wave voltage is applied to the light source circuit 3 from the light modulation control unit 2, and the light source circuit 3 is subjected to light-modulation control such that each of the light-emitting diodes 311 to 317 intermittently emits light. Here, the frequency of the PWM signal generated by the microcomputer 26 is preferably 500 Hz or more, a period during which the light-emitting diodes 311 to 317 emit light and a period during which the light-emitting diodes 311 to 317 do not emit light repeat alternatingly in a cycle of 2 milliseconds or less. As a result, since the cycle of the light emission from the light-emitting diodes 311 to 317 becomes 2 milliseconds or less, the light from the light-emitting diodes 311 to 317 is perceived by human eyes as being continuously emitted from the light-emitting diodes 311 to 317, and the flickering of light is hardly noticed.

Also, the ratio between the period during which the light-emitting diodes 311 to 317 emit light and the period during which the light-emitting diodes 311 to 317 do not emit light is changed according to the duty ratio of the PWM signal outputted from the microcomputer 26, and thereby the light modulation level of the light source circuit 3 is controlled. Here, because the MOSFET 21 operates as merely a switch for switching the DC voltage of the DC power supply circuit 1 between being supplied and being not supplied to the light source circuit 3, the switching loss decreases compared with the chopper circuit, and the efficiency is improved. Also, the DC voltage of the DC power supply circuit 1 is approximately set to a voltage value (DC 24 V, for example) capable of causing the light-emitting diodes 311 to 317 of the light source circuit 3 to emit light. The square wave voltage that is outputted from the light modulation control unit 2 to the light source circuit 3 has an amplitude equal to the voltage value of the DC voltage that is outputted from the DC power supply circuit 1. (That is, the DC voltage of the DC power supply circuit 1 is directly applied to the light source unit 3.) Accordingly, because small components having a low breakdown voltage can be used as the circuit components such as the MOSFET 21, the light modulation control unit 2 can be miniaturized compared with a case where the light source circuit 3 is supplied with a voltage that is generated by stepping down, by a step down chopper, a voltage that is stepped up by a step up chopper.

Figure 2:
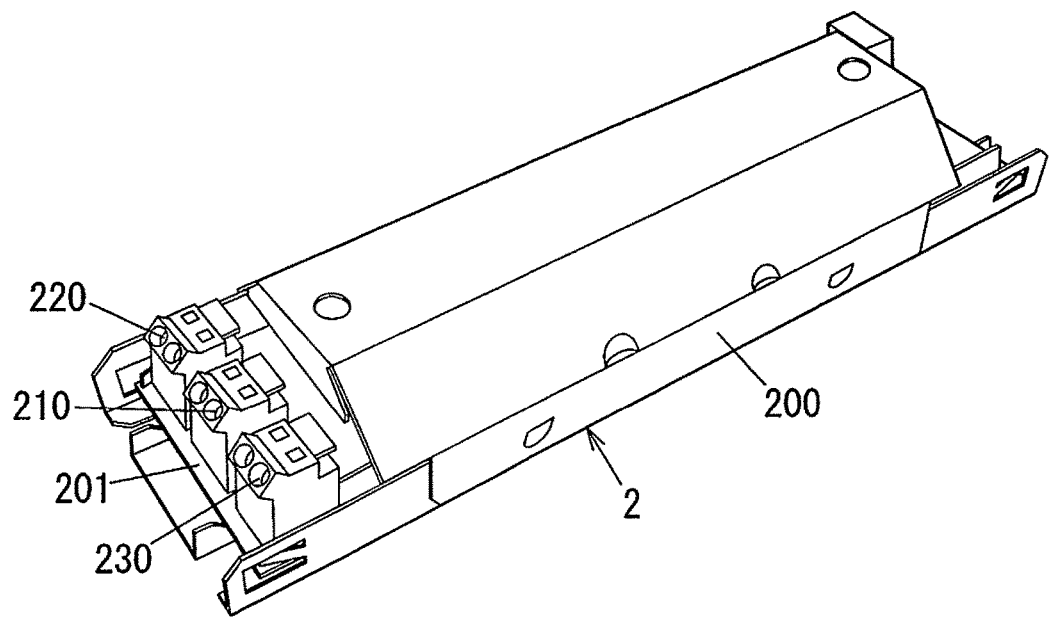
FIG. 2 is an external perspective view of a light modulation control unit of the embodiment.

FIG. 2 is an external perspective view of the light modulation control unit 2. The light modulation control unit 2 includes an elongated metal case 200 whose two end portions in a longitudinal direction are open. A circuit board 201 on which circuit components that constitute the circuit shown in FIG. 1 are mounted is housed inside the case 200. Screwless terminal blocks 210, 220, and 230 are mounted on one end of the circuit board 201. The terminal blocks 210, 220, and 230 are exposed to the outside through one opening of the case 200. The terminal block 210 is provided with connection terminals 211 and 212 for connecting wires from the DC power supply circuit 1. The terminal block 220 is provided with connection terminals 221 and 222 for connecting wires from the light source circuit 3. The terminal block 230 is provided with connection terminals 231 and 232 for connecting wires from the light modulation signal output circuit 4.

Figure 3:
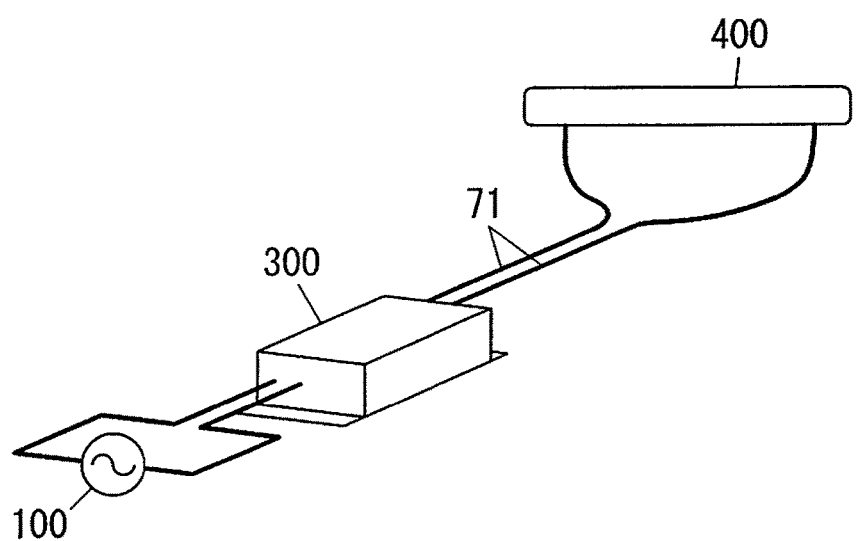
FIG. 3 is a schematic configuration diagram of an illumination system that does not include a light modulation control unit.

FIG. 3 is a schematic configuration diagram of an illumination system that is not provided with the light modulation control unit 2. In the illumination system, the light source circuit 3 inside a light source unit 400 is connected to the DC power supply circuit 1 inside a DC power supply unit 300 by wires 71. That is, the illumination system is configured such that the output voltage of the DC power supply circuit 1 is directly applied to the light source circuit 3, and the light-emitting diodes 311 to 317 of the light source circuit 3 emit light. The illumination system does not include a function of performing light modulation control on the light source circuit 3, and causes each of the light-emitting diodes 311 to 317 of the light source circuit 3 to be fully lighted.

Figure 4:
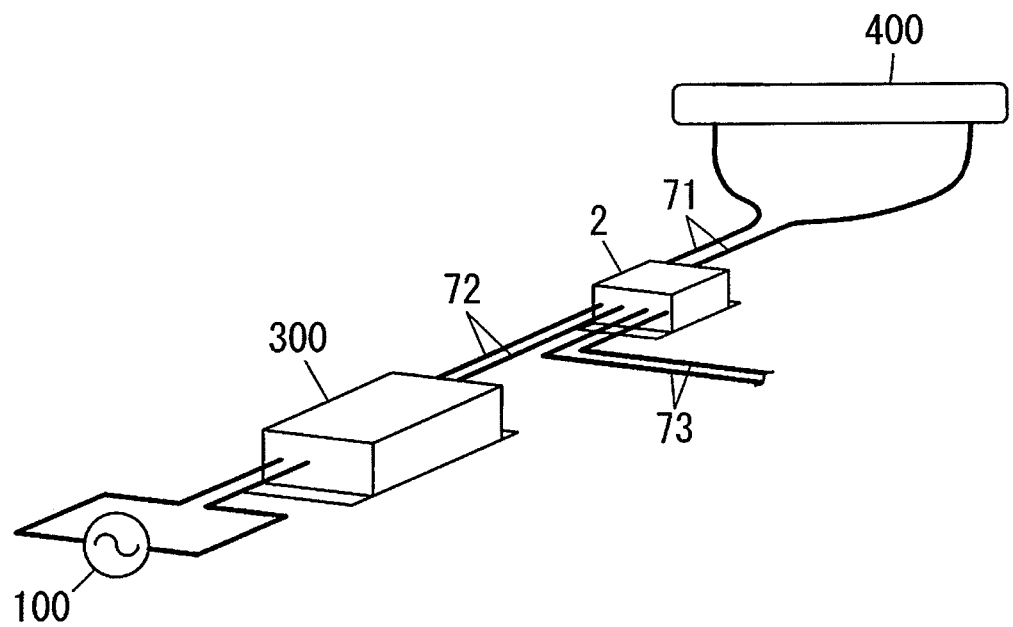
FIG. 4 is a schematic configuration diagram of the illumination system of the embodiment.

FIG. 4 is a schematic configuration diagram of the illumination system of the present embodiment, and the light modulation control unit 2 is connected between the DC power supply unit 300 and the light source unit 400. In the light modulation control unit 2, the wires 71 from the light source circuit 3 inside the light source unit 400 are connected to the terminal block 220, wires 72 from the DC power supply circuit 1 inside the DC power supply unit 300 are connected to the terminal block 210, and wires 73 from the light modulation signal output circuit 4 are connected to the terminal block 230. Accordingly, with an existing illumination system that does not include the light modulation control unit 2, as shown in FIG. 3, an illumination system in which light modulation control can be performed on the light-emitting diodes 311 to 317 of the light source circuit 3 can be realized by adding the light modulation control unit 2 and providing wiring between the units, as shown in FIG. 4.

Incidentally, in the light modulation control unit 2 of the present embodiment, although the microcomputer 26 continuously changes the light modulation level of the light source circuit 3 according to the duty ratio of the light modulation signal S1 that is inputted from the light modulation signal output circuit 4, the light modulation level of the light source circuit 3 may be changed in a stepwise manner.

For example, a control method in the case where the light modulation control unit 2 controls the light modulation level of the light source circuit 3 in three steps (three steps of 100%, 70%, and 50%, for example) will be described. Note that the number of light-modulation steps and the light-modulation levels in the case of performing stepwise light modulation are exemplary, and may be changed appropriately.

A plurality of candidate values of the duty ratio are pre-set in the light modulation signal output circuit 4. The light modulation signal output circuit 4 is configured to select one candidate value (duty ratio) among the plurality of candidate values according to an operation input of a user, for example, and output the light modulation signal S1 constituted by a PWM signal corresponding to the selected candidate value (duty ratio).

The light modulation signal S1 is inputted to the signal conversion circuit 25 from the light modulation signal output circuit 4 via the connection terminals 231 and 232. The signal conversion circuit 25 is configured to generate the voltage signal S2 having a voltage value corresponding to the duty ratio of the light modulation signal S1 by smoothing the light modulation signal S1 constituted by the PWM signal, and output the voltage signal S2 to the microcomputer 26.

The microcomputer 26 compares the voltage signal S2 inputted from the signal conversion circuit 25 with a pre-set first threshold and a pre-set second threshold (first threshold<second threshold). Here, the first threshold is set to the same value as the voltage value of the voltage signal S2 that is outputted from the signal conversion circuit 25 when the duty ratio of the light modulation signal S1 is 15%. The second threshold is set to the same value as the voltage value of the voltage signal S2 that is outputted from the signal conversion circuit 25 when the duty ratio of the light modulation signal S1 is 25%.

If the result of comparison between the voltage signal S2 and the first threshold and the second threshold is that the voltage value of the voltage signal S2 is less than or equal to the first threshold, the microcomputer 26 determines that the duty ratio of the light modulation signal S1 is 0% or more and 15% or less, and controls the light modulation level of the light source circuit 3 to 100% in this case. The microcomputer 26 outputs a control signal for causing the MOSFET 21 to be continuously on to the drive circuit 27, the drive circuit 27 causes the MOSFET 21 to be continuously on, and as a result the light-emitting diodes 311 to 317 of the light source circuit 3 emit light at the light modulation level of 100%.

If the result of comparison between the voltage signal S2 and the first threshold and the second threshold is that the voltage value of the voltage signal S2 is higher than the first threshold and less than or equal to the second threshold, the microcomputer 26 determines that the duty ratio of the light modulation signal S1 is more than 15% and 25% or less. In this case, the microcomputer 26 controls the light modulation level of the light source circuit 3 to 70%. The microcomputer 26 outputs a PWM signal whose duty ratio is 70% to the drive circuit 27, the drive circuit 27 turns the MOSFET 21 on and off according to the PWM signal, and as a result a square wave voltage whose duty ratio is 70% is applied to the light source circuit 3. Accordingly, a period during which current flows in the light source circuit 3 decreases in comparison to that in the fully lighted state, and the light-emitting diodes 311 to 317 of the light source circuit 3 emit light at the light modulation level of approximately 70%.

Also, if the result of comparison between the voltage signal S2 and the first threshold and the second threshold is that the voltage value of the voltage signal S2 is higher than the second threshold, the microcomputer 26 determines that the duty ratio of the light modulation signal S1 is more than 25%, and controls the light modulation level of the light source circuit 3 to 50%. The microcomputer 26 outputs a PWM signal whose duty ratio is 50% to the drive circuit 27, the drive circuit 27 turns the MOSFET 21 on and off according to the PWM signal, and as a result a square wave voltage whose duty ratio is 50% is applied to the light source circuit 3. Accordingly, the light-emitting diodes 311 to 317 of the light source circuit 3 emit light at the light modulation level of approximately 50%.

As described above, the light modulation control unit 2 controls the light modulation level of the light source circuit 3 in a stepwise manner according to the duty ratio of the light modulation signal S1 received from the light modulation signal output circuit 4.

Incidentally, in the light modulation control unit 2 whose circuit diagram is shown in FIG. 1, although the light modulation level of the light source circuit 3 is changed according to the light modulation signal S1 inputted from the light modulation signal output circuit 4, the light modulation level may be changed with a method other than the method in which the light modulation signal S1 is used.

Figure 5:
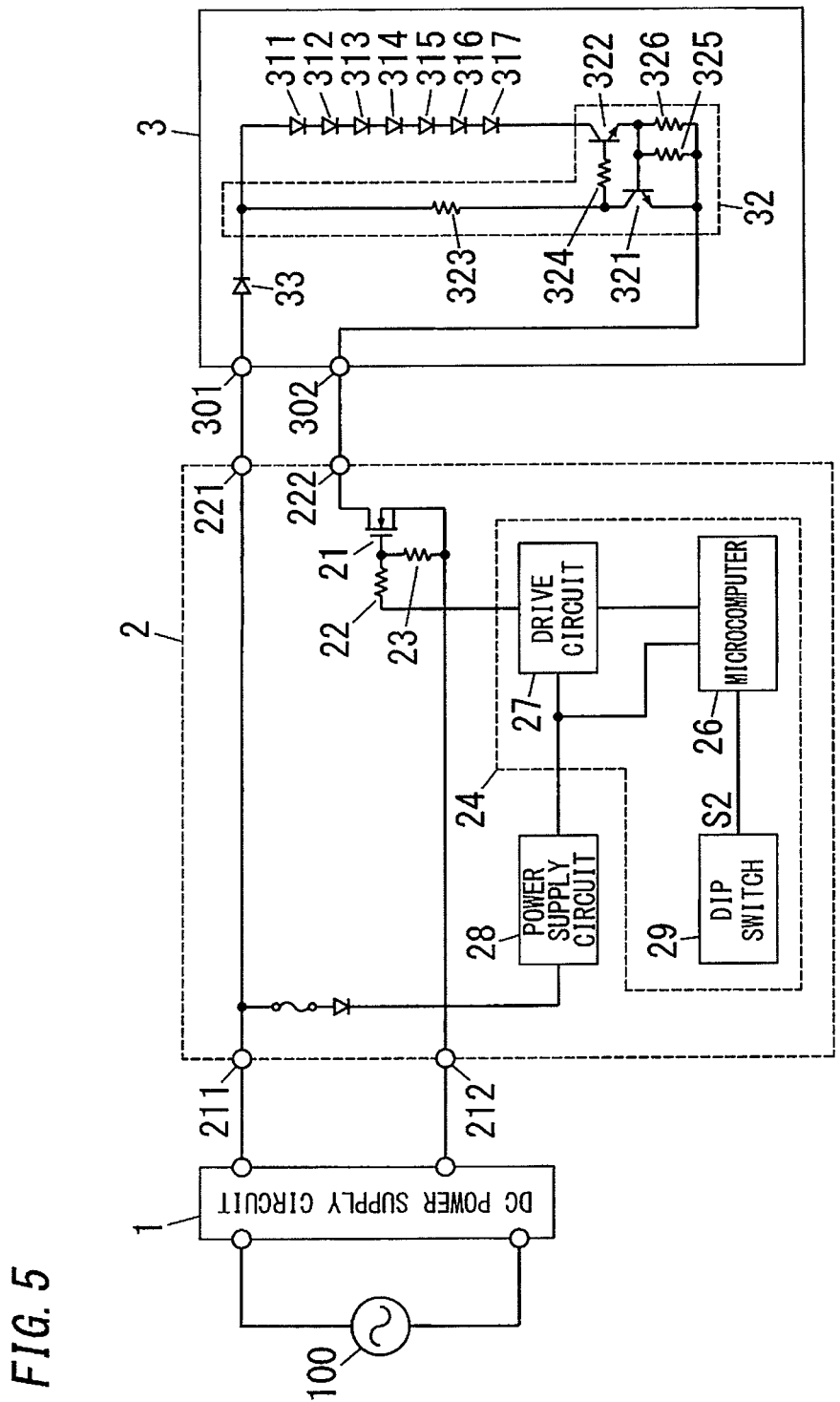
FIG. 5 is a circuit diagram illustrating another configuration of the illumination system of the embodiment.

For example, as shown in FIG. 5, the light modulation control unit 2 may include a DIP switch 29 for setting the light modulation level.

The DIP switch 29 is a 4-bit DIP switch, for example, and output terminals of respective bits are connected to a parallel input port of the microcomputer 26. The bits of the DIP switch 29 respectively correspond to the setting values (bit 1 corresponds to 100%, bit 2 to 80%, bit 3 to 70%, and bit 4 to 50%, for example) of the light modulation level.

The microcomputer 26 monitors the turning on and off of the bits of the DIP switch 29. When one of the bits is set to an on state, the microcomputer 26 determines that the light modulation level is set to a setting value corresponding to the bit that is set to an on state, generates a PWM signal whose duty ratio corresponds to the set light modulation level, and outputs the PWM signal to the drive circuit 27. Then, the drive circuit 27 turns the MOSFET 21 on and off according to the PWM signal inputted from the microcomputer 26, and as a result a square wave voltage corresponding to the duty ratio of the PWM signal is applied to the light source circuit 3. Accordingly, the light-emitting diodes 311 to 317 of the light source circuit 3 emit light at the light modulation level set by the DIP switch 29.

As described above, since the light modulation level is set using the DIP switch 29, the circuit configuration is simplified compared with the case where the signal conversion circuit 25 converts the externally inputted light modulation signal S1 to the voltage signal S2 and outputs the voltage signal S2 to the microcomputer 26. Also, as a result of the power consumption in the signal conversion circuit 25 being cut, the power consumption in the light modulation control unit 2 can be reduced.

Note that the switch for setting the light modulation level of the light source circuit 3 is not limited to the DIP switch 29, and may be a switch such as a rotary switch.

The illumination system described in the above embodiment is, of course, applicable to lighting fixtures for space lighting, and is also applicable to facility apparatuses including a light source circuit for illumination. Such facility apparatuses include a refrigerated showcase and a hot showcase that include a light source circuit for illuminating commodities, a vending machine that includes a light source circuit for illuminating commodities or commodity samples, and the like.

Figure 6:
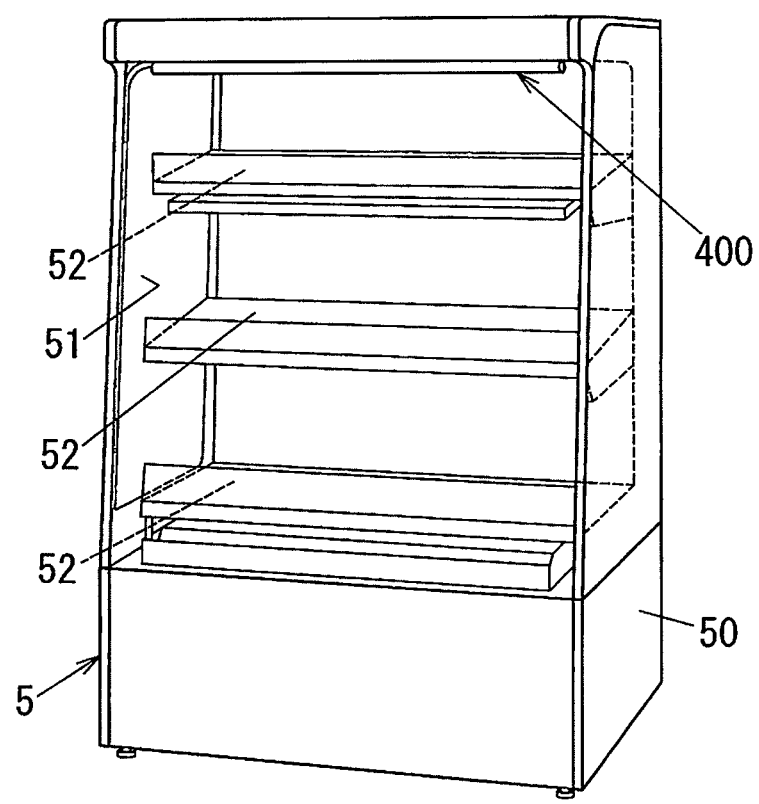
FIG. 6 is an external perspective view of a refrigerated showcase to which the illumination system of the embodiment is applied.

FIG. 6 is an external perspective view of a refrigerated showcase 5 to which the illumination system of the present embodiment is applied. The refrigerated showcase 5 is installed in a retail store such as a convenience store, for example, and is used for displaying and selling commodities while cooling the commodities. A body 50 of the refrigerated showcase 5 includes a display room 51 whose front face is open. Two or more (three, in the diagram) display racks 52 for displaying commodities are provided in the display room 51. In the body 50, the light source unit 400 that houses the light source circuit 3 is installed in a ceiling portion of the display room 51, and the DC power supply circuit 1 and the light modulation control unit 2 are mounted in the body 50. The light source circuit 3 in the light source unit 400 is subjected to light-modulation control by the light modulation control unit 2, and commodities that are displayed on the display racks 52 are illuminated by light emitted from the light-emitting diodes 311 to 317 of the light source circuit 3. Note that the illumination system of the present embodiment may be applied to a hot showcase for displaying and selling commodities while heating the commodities instead of the refrigerated showcase 5.

Figure 7:
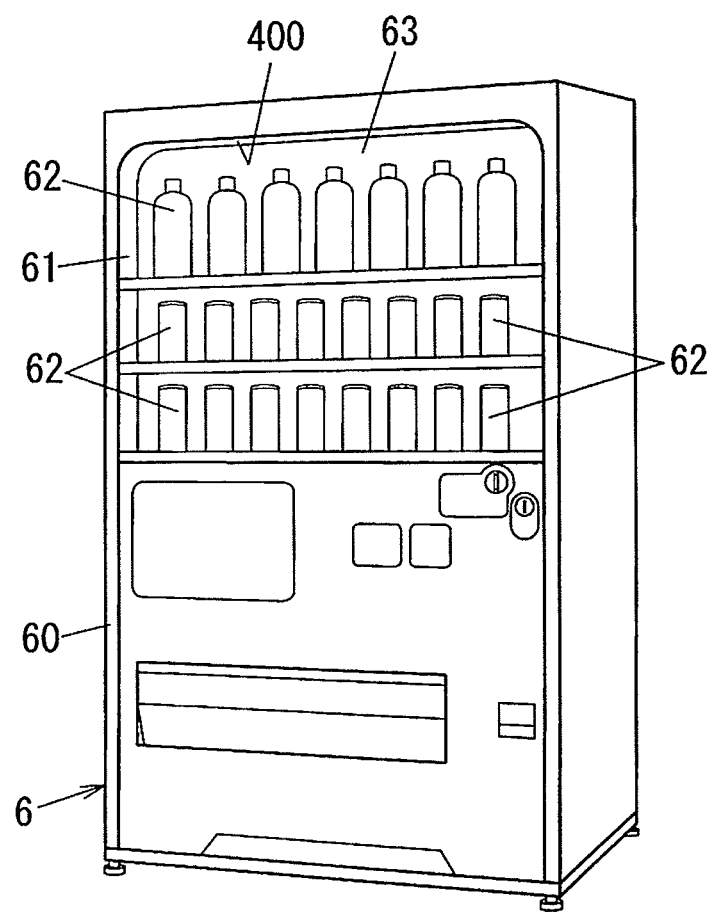
FIG. 7 is an external perspective view of a vending machine to which the illumination system of the embodiment is applied.

FIG. 7 is an external perspective view of a vending machine 6 to which the illumination system of the present embodiment is applied. A display compartment 61 for displaying commodity samples 62 is provided inside a body 60 of the vending machine 6, and the inside of the display compartment 61 can be seen through a transparent window portion 63 provided in a front face of the body 60. Inside the body 60, the light source unit 400 that houses the light source circuit 3 is arranged on an upper side of the display compartment 61, for example. Also, the DC power supply circuit 1 and the light modulation control unit 2 are arranged inside the body 60. The light source circuit 3 of the light source unit 400 is subjected to light-modulation control by the light modulation control unit 2, and the commodity samples 62 that are placed in the display compartment 61 are illuminated by light emitted from the light-emitting diodes 311 to 317 of the light source circuit 3.

As a result of the recent rise in energy-saving consciousness, there is a need for suppressing power consumption of a light source circuit in order to suppress power consumption of facility apparatuses in seasons such as summer and winter in which demand for electric power increases and in a time slot such as daytime, during which natural light exists. The facility apparatuses of the present embodiment include the light modulation control unit 2, and as a result of the light modulation control unit 2 performing light-modulation control on the light-emitting diodes 311 to 317 of the light source circuit 3 for light emission, power consumption of the light source circuit 3 can be suppressed while illuminating objects such as a commodity and a commodity sample.

As apparent from the embodiment described above, a light modulation control unit (2) according to a first aspect of the present technology is for a light source circuit (3) driven by a DC power supply (DC power supply circuit 1). The light source circuit (3) includes a semiconductor light-emitting element (light-emitting diodes 311 to 317). The DC power supply is configured to output a DC voltage having a voltage value capable of causing the semiconductor light-emitting element to emit light. The light modulation control unit (2) includes a switching element (MOSFET 21) and a control circuit (24). The switching element is configured to be electrically connected between the light source circuit (3) and the DC power supply. The control circuit (24) is configured to control a switching operation of the switching element. The control circuit (24) is configured to perform switching of the switching element with a duty ratio corresponding to a light modulation level such that the DC voltage that is outputted from the DC power supply is converted to a square wave voltage, and the square wave voltage is outputted to the light source circuit (3). The square wave voltage has an amplitude equal to the voltage value of the DC voltage that is outputted from the DC power supply.

According to the first aspect, since the square wave voltage having the duty ratio corresponding to the set light modulation level is applied to the light source circuit (3) by the control circuit (24) performing switching of the switching element, the light modulation control can be performed on the light source circuit (3). In this case, the square wave voltage has an amplitude equal to the voltage value of the DC voltage that is outputted from the DC power supply. That is, the DC voltage of the DC power supply is directly applied to the light source unit (3). Accordingly, because small components having a low breakdown voltage can be used as circuit components such as switching elements, the light modulation control unit (2) can be miniaturized, compared with a case where the light source circuit (3) is supplied with a voltage that is generated by stepping down, by a step down chopper, a voltage that is stepped up by a step up chopper. In addition, because the switching element operates as merely a switch for switching the DC voltage of the DC power supply between being supplied and being not supplied to the light source circuit (3), the switching loss decreases compared with a chopper circuit, and the efficiency is improved.

Regarding a light modulation control unit (2) according to a second aspect of the present technology, in the first aspect, the control circuit (24) may be configured to perform light modulation control on the light source circuit (3) by changing the duty ratio.

According to the second aspect, since the control circuit (24) performs the light modulation control on the light source circuit (3) by changing the duty ratio, it is possible to change the light modulation level of the light source circuit (3), and improve the usability.

Regarding a light modulation control unit (2) according to a third aspect of the present technology, in the second aspect, the control circuit (24) may be configured to set the duty ratio among a plurality of candidate values and cause a light output of the semiconductor light-emitting element (light-emitting diodes 311 to 317) of the light source circuit (3) to change in a stepwise manner by switching the switching element (MOSFET 21) with the duty ratio that has been set.

According to the third aspect, since a period during which a current flows through the light source circuit (3) changes in a stepwise manner by the control circuit (24) setting the duty ratio among the plurality of candidate values, the light output of the semiconductor light-emitting element (light-emitting diodes 311 to 317) of the light source circuit (3) can be changed in a stepwise manner.

Regarding a light modulation control unit (2) according to a fourth aspect of the present technology, in the second aspect, the control circuit (24) may be configured to cause a light output of the semiconductor light-emitting element (light-emitting diodes 311 to 317) of the light source circuit (3) to change continuously by changing the duty ratio continuously.

According to the fourth aspect, since the light output of the semiconductor light-emitting element (light-emitting diodes 311 to 317) of the light source circuit (3) changes continuously by the control circuit (24) changing the duty ratio continuously, it is possible to adjust the light output of the light source circuit (3) to a desired light output.

Regarding a light modulation control unit (2) according to a fifth aspect of the present technology, in any one of the first to fourth aspects, the control circuit (24) may be configured to perform switching of the switching element (MOSFET 21) such that a frequency of the square wave voltage is 500 Hz or more.

According to the fifth aspect, since the frequency of the square wave voltage applied to the light source circuit (3) is 500 Hz or more, the cycle of the light emission from the light source circuit (3) becomes 2 milliseconds or less. As a result, the light from the semiconductor light-emitting element is perceived by human eyes as being continuously emitted from the semiconductor light-emitting element and the flickering of light is hardly noticed.

Regarding a light modulation control unit (2) according to a sixth aspect of the present technology, in any one of the first to fifth aspects, the light modulation control unit (2) may further include: a first connection portion (connection terminals 211 and 212) to which the DC power supply (DC power supply circuit 1) is to be connected; and a second connection portion (connection terminals 221 and 222) to which the light source circuit (3) is to be connected. The square wave voltage obtained by switching the DC voltage inputted from the DC power supply via the first connection portion with the switching element (MOSFET 21) is outputted to the light source circuit (3) from the second connection portion.

According to the sixth aspect, using an existing illumination system in which the DC power supply is connected to the light source circuit (3) by wires, it is possible to easily provide an illumination system which can perform the light modulation control on the light source circuit (3), by connecting wires from the DC power supply to the first connection portion and connecting wires from the light source circuit (3) to the second connection portion.

An illumination system according to a seventh aspect of the present technology includes: a light source circuit (3) including a semiconductor light-emitting element (light-emitting diodes 311 to 317); and the light modulation control unit (2) according to any one of the first to sixth aspects that is configured to perform light modulation control on the light source circuit (3).

According to the seventh aspect, it is possible to provide the illumination system that includes a small light modulation control unit (2) having reduced switching loss.

A facility apparatus according to an eighth aspect of the present technology includes a light source circuit (3), the light modulation control unit (2) according to any one of the first to sixth aspects, and a facility apparatus body (bodies 50 and 60). The light source circuit (3) includes a semiconductor light-emitting element (light-emitting diodes 311 to 317). The light modulation control unit (2) is configured to perform light modulation control on the light source circuit (3). The facility apparatus body is configured to hold the light source circuit (3) and the light modulation control unit (2).

According to the eighth aspect, it is possible to provide the facility apparatus that includes a small light modulation control unit (2) having reduced switching loss, and suppress power consumption of the facility apparatus by performing the light modulation control on the light source circuit (3).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light modulation control unit for a light source circuit driven by a DC power supply, the light source circuit comprising a semiconductor light-emitting element, and the DC power supply being configured to output a DC voltage having a voltage value capable of causing the semiconductor light-emitting element to emit light, the light modulation control unit comprising:
- a switching element configured to be electrically connected between the light source circuit and the DC power supply; and
- a control circuit configured to control a switching operation of the switching element,
- the control circuit being configured to perform switching of the switching element with a duty ratio corresponding to a light modulation level such that the DC voltage that is outputted from the DC power supply is converted to a square wave voltage, and the square wave voltage is outputted to the light source circuit, and
- the square wave voltage having an amplitude equal to the voltage value of the DC voltage that is outputted from the DC power supply.

2. The light modulation control unit according to claim 1, wherein the control circuit is configured to perform light modulation control on the light source circuit by changing the duty ratio.

3. The light modulation control unit according to claim 2, wherein the control circuit is configured to set the duty ratio among a plurality of candidate values and cause a light output of the semiconductor light-emitting element of the light source circuit to change in a stepwise manner by switching the switching element with the duty ratio that has been set.

4. The light modulation control unit according to claim 3, wherein the control circuit is configured to perform switching of the switching element such that a frequency of the square wave voltage is 500 Hz or more.

5. The light modulation control unit according to claim 4, further comprising:
- a first connection portion to which the DC power supply is to be connected; and
- a second connection portion to which the light source circuit is to be connected,
- wherein the square wave voltage obtained by switching the DC voltage inputted from the DC power supply via the first connection portion with the switching element is outputted to the light source circuit from the second connection portion.

6. The light modulation control unit according to claim 3, further comprising:
- a first connection portion to which the DC power supply is to be connected; and
- a second connection portion to which the light source circuit is to be connected,
- wherein the square wave voltage obtained by switching the DC voltage inputted from the DC power supply via the first connection portion with the switching element is outputted to the light source circuit from the second connection portion.

7. The light modulation control unit according to claim 2, wherein the control circuit is configured to cause a light output of the semiconductor light-emitting element of the light source circuit to change continuously by changing the duty ratio continuously.

8. The light modulation control unit according to claim 7, wherein the control circuit is configured to perform switching of the switching element such that a frequency of the square wave voltage is 500 Hz or more.

9. The light modulation control unit according to claim 8, further comprising:
- a first connection portion to which the DC power supply is to be connected; and
- a second connection portion to which the light source circuit is to be connected,
- wherein the square wave voltage obtained by switching the DC voltage inputted from the DC power supply via the first connection portion with the switching element is outputted to the light source circuit from the second connection portion.

10. The light modulation control unit according to claim 4, further comprising:
- a first connection portion to which the DC power supply is to be connected; and
- a second connection portion to which the light source circuit is to be connected,
- wherein the square wave voltage obtained by switching the DC voltage inputted from the DC power supply via the first connection portion with the switching element is outputted to the light source circuit from the second connection portion.

11. The light modulation control unit according to claim 2, wherein the control circuit is configured to perform switching of the switching element such that a frequency of the square wave voltage is 500 Hz or more.

12. The light modulation control unit according to claim 11, further comprising:
- a first connection portion to which the DC power supply is to be connected; and
- a second connection portion to which the light source circuit is to be connected,
- wherein the square wave voltage obtained by switching the DC voltage inputted from the DC power supply via the first connection portion with the switching element is outputted to the light source circuit from the second connection portion.

13. The light modulation control unit according to claim 2, further comprising:
- a first connection portion to which the DC power supply is to be connected; and
- a second connection portion to which the light source circuit is to be connected,
- wherein the square wave voltage obtained by switching the DC voltage inputted from the DC power supply via the first connection portion with the switching element is outputted to the light source circuit from the second connection portion.

14. The light modulation control unit according to claim 1, wherein the control circuit is configured to perform switching of the switching element such that a frequency of the square wave voltage is 500 Hz or more.

15. The light modulation control unit according to claim 14, further comprising:
- a first connection portion to which the DC power supply is to be connected; and
- a second connection portion to which the light source circuit is to be connected,
- wherein the square wave voltage obtained by switching the DC voltage inputted from the DC power supply via the first connection portion with the switching element is outputted to the light source circuit from the second connection portion.

16. The light modulation control unit according to claim 1, further comprising:
- a first connection portion to which the DC power supply is to be connected; and a second connection portion to which the light source circuit is to be connected, wherein the square wave voltage obtained by switching the DC voltage inputted from the DC power supply via the first connection portion with the switching element is outputted to the light source circuit from the second connection portion.

17. An illumination system comprising:

a light source circuit comprising a semiconductor light-emitting element; and a light modulation control unit configured to perform light modulation control on the light source circuit, the light modulation control unit comprising:

a switching element configured to be electrically connected between the light source circuit and a DC power supply, the DC power supply being configured to output a DC voltage having a voltage value capable of causing the semiconductor light-emitting element to emit light; and a control circuit configured to control a switching operation of the switching element, the control circuit being configured to perform switching of the switching element with a duty ratio corresponding to a light modulation level such that the DC voltage that is outputted from the DC power supply is converted to a square wave voltage, and the square wave voltage is outputted to the light source circuit, and the square wave voltage having an amplitude equal to the voltage value of the DC voltage that is outputted from the DC power supply.

18. A facility apparatus comprising:

a light source circuit comprising a semiconductor light-emitting element;

a light modulation control unit configured to perform light modulation control on the light source circuit; and a facility apparatus body configured to hold the light source circuit and the light modulation control unit, the light modulation control unit comprising:

a switching element configured to be electrically connected between the light source circuit and a DC power supply, the DC power supply being configured to output a DC voltage having a voltage value capable of causing the semiconductor light-emitting element to emit light; and a control circuit configured to control a switching operation of the switching element, the control circuit being configured to perform switching of the switching element with a duty ratio corresponding to a light modulation level such that the DC voltage that is outputted from the DC power supply is converted to a square wave voltage, and the square wave voltage is outputted to the light source circuit, and the square wave voltage having an amplitude equal to the voltage value of the DC voltage that is outputted from the DC power supply.

\* \* \* \* \*